(12) United States Patent
Vrana et al.

(10) Patent No.: US 7,704,151 B2
(45) Date of Patent: Apr. 27, 2010

(54) SELF-ATTACHING FEMALE FASTENERS, METHOD OF FORMING SAME AND STRIP OF INTERCONNECTED FASTENERS

(75) Inventors: John J. Vrana, Rochester Hills, MI (US); Harold A. Ladouceur, Livonia, MI (US)

(73) Assignee: Whitesell International Corporation, Taylor, MI (US)

( * ) Notice: Subject to any disclaimer, the term of this patent is extended or adjusted under 35 U.S.C. 154(b) by 516 days.

(21) Appl. No.: 11/545,297

(22) Filed: Oct. 10, 2006

(65) Prior Publication Data
US 2007/0099714 A1 May 3, 2007

Related U.S. Application Data

(60) Provisional application No. 60/732,496, filed on Nov. 2, 2005.

(51) Int. Cl.
*B21D 53/24* (2006.01)
(52) U.S. Cl. .............................. 470/25; 470/18; 470/21; 72/331
(58) Field of Classification Search .................. 470/18, 470/20, 21, 22, 25, 26, 89, 91, 93, 95, 109, 470/166; 72/329, 331, 333, 335, 336, 338, 72/206, 404
See application file for complete search history.

(56) References Cited

U.S. PATENT DOCUMENTS

| 833,188 | A | * | 10/1906 | Ward | 470/25 |
|---|---|---|---|---|---|
| 928,508 | A | * | 7/1909 | Dunham | 470/25 |
| 1,753,597 | A | * | 4/1930 | Burns | 470/19 |
| 2,320,651 | A | * | 6/1943 | Poux | 72/187 |
| 2,707,322 | A | | 5/1955 | Strain et al. | |
| 3,648,747 | A | | 3/1972 | Steward | |
| 3,704,507 | A | * | 12/1972 | Grube | 29/417 |
| 3,775,791 | A | | 12/1973 | Grube | |
| 3,845,860 | A | | 11/1974 | Ladouceur et al. | |
| 3,926,236 | A | | 12/1975 | Pouch et al. | |
| 4,124,050 | A | * | 11/1978 | Ackerman | 411/179 |
| 4,237,567 | A | | 12/1980 | Grube | |
| 5,549,430 | A | | 8/1996 | Takahashi et al. | |
| 6,997,659 | B2 | | 2/2006 | Vrana et al. | |
| 7,314,417 | B2 | * | 1/2008 | Babej et al. | 470/25 |

OTHER PUBLICATIONS

International Search Report dated Apr. 4, 2007.

\* cited by examiner

*Primary Examiner*—Edward Tolan

(57) ABSTRACT

A method of forming pierce and clinch nuts by rolling a section having the desired cross-section, punching equally spaced bores through the central pilot portion and then punching configured openings through the central pilot portion having convex arcuate surfaces and eliminating sharp corners. The strip of interconnected self-attaching fasteners may be installed directly from the strip in a panel, fed in bulk or separate fasteners interconnected by frangible connectors. The resultant self-attaching nut includes a central pilot portion having a bore through the top face, integral flange portions extending from opposed sides and the pilot portion includes convex arcuate faces reducing or eliminating stress cracking and propagation of stress cracks.

20 Claims, 5 Drawing Sheets

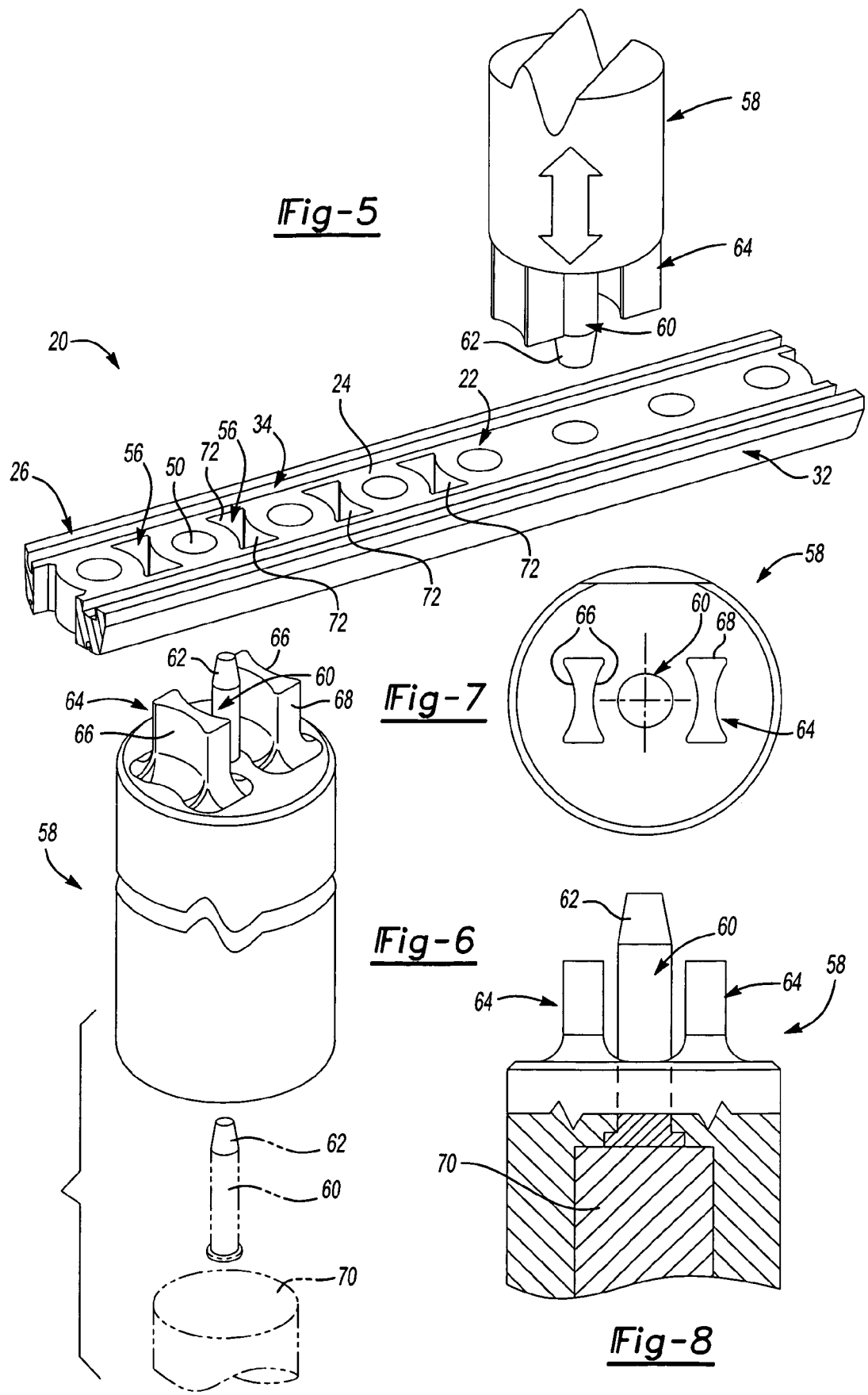

SELF-ATTACHING FEMALE FASTENERS, METHOD OF FORMING SAME AND STRIP OF INTERCONNECTED FASTENERS

RELATED APPLICATIONS

This application claims priority to Provisional Application Ser. No. 60/732,496 filed Nov. 2, 2005.

FIELD OF THE INVENTION

This invention relates to self-attaching female fasteners, including pierce and clinch nuts which may be rolled from a metal section in a continuous rolling process having a rounded pilot portion, a method of forming such self-attaching female fasteners and a strip of interconnected self-attaching female fasteners.

BACKGROUND OF THE INVENTION

Self-piercing female fasteners or pierce nuts were invented and developed by the predecessor in interest of the assignee of this application over fifty years ago as disclosed, for example, in U.S. Pat. No. 2,707,322. A pierce nut is driven by a reciprocable plunger to pierce its own opening in a panel and the pierce nut is then permanently secured in the panel by a die member. The pierce nut disclosed in this patent has been commercially successful, particularly for mass production applications for attachment of one component to a second component by the automotive and appliance industries. In a typical application, the pierce nut is installed in a metal panel by an installation head commonly installed in the upper die shoe or die platen of a die press and the die member or die button is installed in the lower die shoe or die platen of the die press. The panel to which the pierce nut is installed may be simultaneously formed by the die press. Numerous improvements have been made to the pierce nut disclosed in the above-referenced patent, including improved retention by providing dovetail-shaped grooves on opposed sides of the pilot portion as disclosed, for example, in U.S. Pat. No. 3,648, 747, also assigned to the predecessor in interest of the assignee of the present application. Finally, in many mass production applications, it is preferable to assemble the pierce nuts in a continuous frangible strip as disclosed, for example, in U.S. Pat. No. 3,845,860, which is also assigned to the predecessor in interest of the assignee of the present application.

The pierce nuts of the type disclosed in the above-referenced U.S. patents are formed by rolling the desired cross-sectional configuration of the pierce nuts, generally starting with a round wire, as known by those skilled in this art. The round wire is rolled, flattening opposed sides of the wire and the wire is then continuously rolled into the desired cross-sectional configuration of the pierce nut, generally starting with a round wire, as known by those skilled in this art. The round wire is rolled by flattening opposed sides of the wire and then rolled into the desired cross-section of the pierce nut, including a rectangular central projecting pilot portion and rectangular flange portions on opposed sides of the pilot portion as a result of the rolling process. In the Hi-Stress® pierce nut available from the assignee of this application, grooves are rolled into the top faces of the flange portions on opposed sides of the pilot portion, preferably having at least one inclined groove side wall, referred to as a "re-entrant" groove, which significantly improves the retention of the pierce nut on the panel following installation. The rectangular pilot portion of the nut strip or nut section is pierced or punched, forming a generally cylindrical bore and the pierce nut section is then cut to length between the bores and the bores may be tapped or internally threaded, if desired. Alternatively, the pierce nut bore may remain unthreaded for receipt of a thread forming or thread rolling male fastener.

As will be understood by those skilled in this art and shown in the above-referenced U.S. patents, the pierce nuts formed by the rolling process described are necessarily rectangular and include a rectangular pilot portion having relatively sharp corners which could create or propagate stress risers and cracks in the metal panel during and following installation. Cracking of the panel may reduce the integrity of the nut and panel joint and the joint may leak making the installation unsuitable for a sealed joint. There has therefore been a long felt need for a pierce nut of the type disclosed in the above-referenced U.S. patents which may be formed by a rolling process, but which eliminates the sharp corners of the pilot portion and thus eliminates or reduces the propagation of stress risers and stress cracking. Various attempts have been made by the Applicant and others to eliminate the sharp corners of the pilot portion as disclosed, for example, in co-pending application Ser. No. 10/691,677 filed Oct. 23, 2003, the disclosure of which is incorporated herein by reference.

SUMMARY OF THE INVENTION

As set forth above, the present invention relates to self-attaching female fasteners including pierce and clinch nuts, a method of forming self-attaching female fasteners, utilizing a rolling process, but which eliminates the sharp corners of the pilot portion, and a strip of interconnected self-attaching female fasteners. As described above, the desired cross-sectional shape of the self-attaching nuts may be formed in a conventional high speed rolling mill starting with a circular wire, wherein the pierce nut section includes a central pilot portion and integral flange portions on opposed sides of the central pilot portion. In one preferred embodiment of this invention, parallel re-entrant grooves are rolled into the top faces of the flange portions on opposed sides of the pilot portion. However, this invention is not dependent upon the configuration of the self-attaching female fastener or nut. The method of this invention then includes punching equally spaced generally cylindrical bores through the central pilot portion of the nut strip or nut section. As thus far described, the method of this invention may be conventional.

The method of this invention then includes punching configured openings through the central pilot portion equally spaced between the bores forming arcuate pilot surfaces, preferably convex arcuate surfaces, eliminating the sharp corners and thus eliminating or reducing the creation or propagation of stress risers and cracks in the panel during and following installation. As set forth above, in one preferred embodiment, the method of this invention includes rolling parallel grooves in the top faces of the flange portions on opposed sides of the central pilot portion. In one preferred embodiment, the method of this invention includes rolling parallel grooves having relatively inclined side walls and a V-shaped bottom wall as disclosed in U.S. Pat. No. 6,997,659 assigned to the assignee of this application. Further, in a preferred embodiment, the method of this invention includes forming frustoconical countersinks in the bores on opposed ends of the bores.

In one preferred embodiment of the method of this invention, a unique punch is utilized to punch the configured openings through the central pilot portion. A preferred embodiment of the punch includes a central projecting guide portion or guide post preferably including a frustoconical end portion receivable in the bores of the nut section and at least one punch or two punches equally spaced on opposed sides of the central guide portion with the guide post leading the punch or punches, wherein the method of this invention includes receiving the central guide portion in one of the bores of the nut section and driving the punch or punches into the central pilot portion, punching a configured opening or openings through the central pilot portion equally spaced on opposed sides of the bores. As will be understood, the preferred configuration of the openings punched through the central pilot portion forming the concave annular surfaces will depend in part upon the application. In one preferred embodiment, the method of this invention includes punching "dog bone" shaped configured openings through the central pilot portion of the nut strip or section having opposed concave arcuate side faces and enlarged end portions, such that the self-attaching nut formed from the strip has convex arcuate side surfaces eliminating the sharp corners of the pilot portion and reducing or eliminating propagation of stress cracks. In another embodiment, the method includes punching opposed generally V-shaped openings through the central pilot portion each having a bite portion extending toward the longitudinal axis of the strip and concave side faces, forming convex arcuate faces at the corners of the pilot portion of the self-attaching fasteners. In the disclosed embodiment, the generally V-shaped openings extend through the flange portions of the nut strip. Finally, in a third embodiment of the method of this invention, the method includes punching teardrop-shaped openings through the central pilot portion adjacent the flange portions forming rounded or arcuate convex "corners" on the pilot portion.

The strip of interconnected self-attaching female fasteners formed by the method of this invention described above may be fed directly to a pierce or clinch nut installation head described above, wherein a reciprocating plunger severs an end female fastener from the strip and drives the pilot portion into a panel and installs the nut in the panel as described in the above-referenced U.S. patents. Alternatively, the self-attaching female fasteners may be severed from the nut strip or section and fed to an installation head by conventional bulk feeder systems. In a further alternative embodiment, the method of this invention includes chopping the strip through the axis of the configured openings forming individual self-attaching female fasteners and then interconnecting the self-attaching female fasteners in a strip with frangible connectors. In the disclosed embodiment, the method of this invention includes rolling parallel wire grooves in the bottom face of the nut strip or section and then interconnecting the self-attaching nuts in a strip by frangible wires which are rolled into the wire grooves.

As will be understood from the above description of the method of this invention, the strip of interconnected self-attaching female fasteners of this invention includes a plurality of identical equally spaced self-attaching female fasteners, wherein each of the self-attaching female fasteners include a central pilot portion having a top pilot face, a bore extending through the central pilot portion through the top pilot face, flange portions on opposed sides of the central pilot portions each having a planar top flange face extending parallel to the top pilot portion face, an opening in the side faces of the central pilot portion having a concave arcuate surface, wherein the openings between the adjacent self-attaching female fasteners in the strip are symmetrical and the plurality of self-attaching female fasteners are interconnected in side to side relation. As described above, in one embodiment, the plurality of self-attaching female fasteners are integrally connected and in an alternative embodiment, the plurality of self-attaching female fasteners are connected by frangible connectors, such as wires. In one preferred embodiment of the nut strip, the top faces of the flange portions include parallel grooves, such as the re-entrant grooves described above wherein the side walls of the groove are relatively inclined, and include a V-shaped bottom wall. Further, as described above, in one preferred embodiment of the fastener strip, the bores through the self-attaching fasteners are generally cylindrical having frustoconical countersinks in both ends of the bore. As described in the above-referenced U.S. Pat. No. 6,997,659, the re-entrant groove having a V-shaped bottom wall significantly improves the integrity of the joint formed between the pierce nut and a panel. As described in this patent, the V-shaped bottom wall also improves the dimensional stability of the nut strip as the strip is rolled. The nut bore having frustoconical countersinks at both ends also has important advantages. The countersink at the pilot end of the bore eases the start of threading of a male threaded fastener, such as a bolt or screw, into a threaded bore received through the pilot side of the bore. The countersink in the base side of the bore eliminates folding of tapping burrs into a threaded bore which would interfere with threading of a bolt or other male fastener into the threaded bore.

As will be understood from the above description of the method of forming a self-attaching female fastener and strip of interconnected self-attaching female fasteners of this invention, the self-attaching female fasteners of this invention include a central pilot portion having a top pilot face and a bore extending through the top pilot face and the central pilot portion, integral flange portions extending from opposed sides of the central pilot portion each having top flange faces parallel to the top pilot face and preferably including parallel grooves in the top flange faces, wherein the central pilot portion has convex arcuate side faces, eliminating the sharp corners of the generally rectangular pilot portion as described above, reducing or eliminating propagation of stress risers and cracking of the panel at the corners of the pilot portion. However, actual testing of the self-attaching female fasteners disclosed herein unexpectedly resulted in improved integrity of the joint formed between the self-attaching female fasteners and a panel as disclosed below. Thus, the self-attaching female fasteners and method of this invention solves a long felt need in the art, but also unexpectedly results in an improved installation.

As will be understood by those skilled in this art, various modifications may be made to the disclosed embodiments of the self-attaching female fastener, method of forming same and the strip of interconnecting self-attaching female fasteners of this invention within the purview of the appended claims. The disclosed embodiments of this invention are intended for illustrative purposes only. The following is a brief description of the drawings of this application.

BRIEF DESCRIPTION OF THE DRAWINGS

FIG. 5 is a side perspective view of a method of punching the configured openings between the bores;

FIG. 6 is a top perspective exploded view of the punch shown in FIG. 5;

FIG. 7 is a top view of the punch shown in FIGS. 5 and 6;

FIG. 8 is a side partially cross-sectioned view of the punch shown in FIGS. 5 to 7;

DESCRIPTION OF THE PREFERRED EMBODIMENTS

Figure 2:
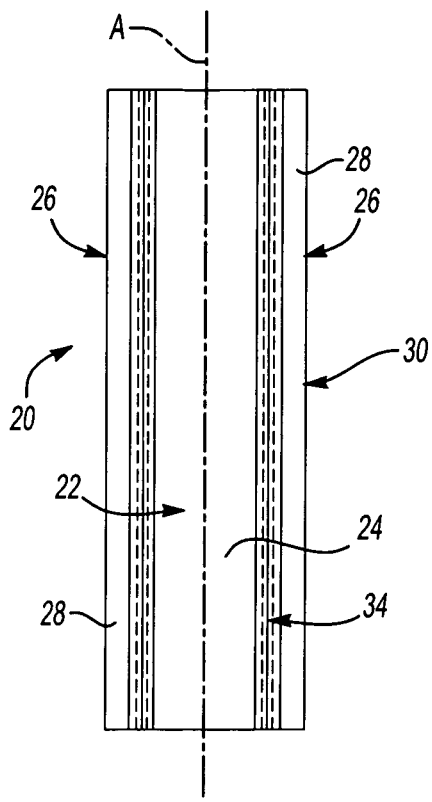
FIG. 2 is a top view of the rolled section shown in FIG. 1.
Figure 1:
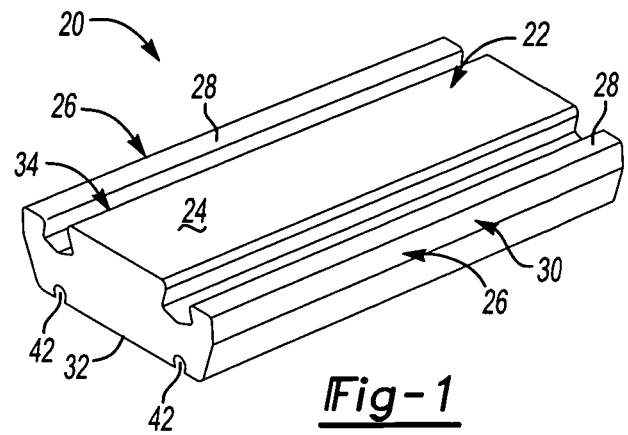
FIG. 1 is a side perspective view of one embodiment of a rolled strip having the cross-section of a self-attaching female fastener.
Figure 4:
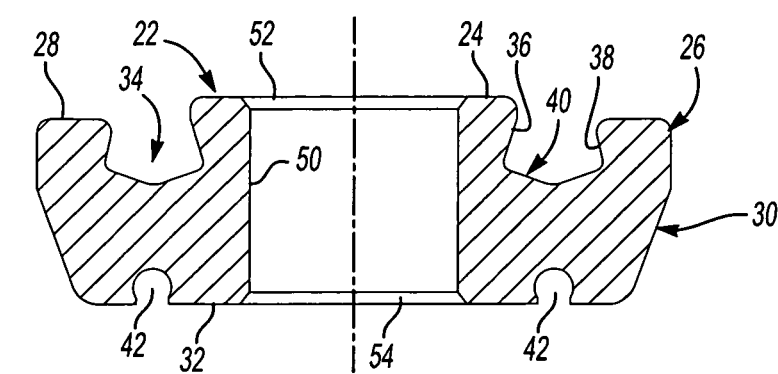
FIG. 4 is a side cross-sectional view of FIG. 3 through a nut bore.

As set forth above, various modifications may be made to this invention within the purview of the appended claims and the following description of the preferred embodiments is for illustrative purposes only. Further, the self-attaching female fastener and fastener strip of this invention may be formed from a rolled metal section, wherein the method of this invention includes rolling a metal section forming a desired cross-section of the self-attaching female fastener. However, the cross-sectional shape of the rolled metal section would depend upon the application for the self-attaching female fastener. In the disclosed embodiment of the nut strip or nut section 20 shown in FIGS. 1 and 2, the rolled nut strip or section 20 includes a central pilot portion 22 having a planar top pilot face 24 and integral flange portions 26 on opposed sides of the central pilot portion 22 each having a planar top flange face 28. Because the nut section 20 is rolled, the top pilot face 24 is parallel to the top flange faces 28 and the side faces 30 are also parallel. The bottom face 32 of the nut section is also parallel to the top faces of the pilot portion and the flange portions 24 and 28, respectively, and the nut section 20 is symmetrical with respect to the longitudinal axis "A." In the disclosed embodiment of the nut section 20, the top flange faces 28 include parallel re-entrant grooves 34. As best shown in FIG. 4, the re-entrant grooves 34 each include an inner side wall 36 which is inclined toward the flange portion 26, an outer side wall 38 which is inclined toward the pilot portion 22 and a V-shaped bottom wall 40. As used herein, the term "re-entrant groove" requires at least one of the inner and outer side walls 36 and 38, respectively, to be inclined toward the other side wall. As set forth above and disclosed in the above-referenced U.S. Pat. No. 6,997,659, re-entrant grooves having a V-shaped bottom wall have a significantly improved retention and a nut section may be more accurately rolled. Further, in the disclosed embodiment, the bottom face 32 includes rolled parallel wire grooves 42 for receipt of frangible connectors as described below. As set forth above, however, the preferred cross-sectional configuration of the nut section 20 will depend upon the application.

Figure 3:
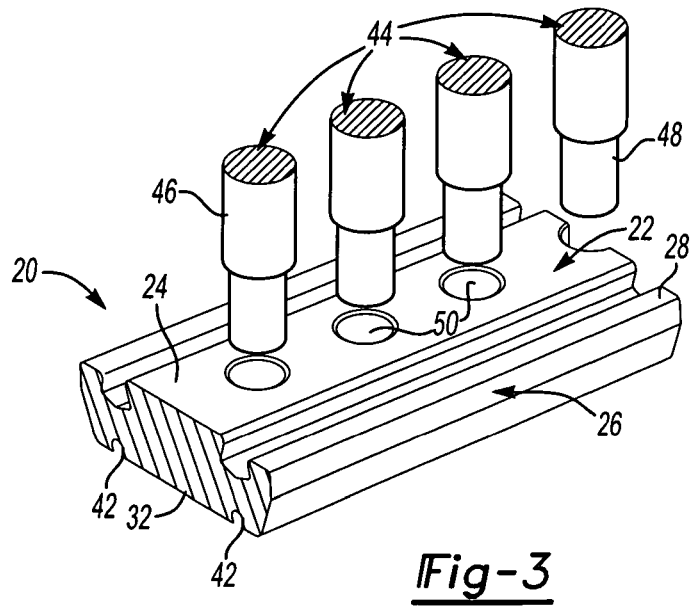
FIG. 3 is a side perspective view of the nut section shown in FIG. 1 during piercing or punching of the nut bores.

Following rolling of the nut section, the nut bores 50 are pierced or punched through the top pilot face 24 of the pilot portion 22 as shown in FIG. 3. A plurality of equally spaced punches 44 which may be interconnected in a gang or array each having a base portion 46 and a smaller diameter cylindrical punch portion 48 are equally spaced above the nut section 20 in a parallel array. As will be understood by those skilled in this art, the punches 44 are equally spaced and punch a plurality of equally spaced generally cylindrical bores 50 with each stroke of the gang of punches 44. However, two punches 44 may be preferred. In a preferred embodiment of the method of this invention, the base portions 46 of the punches 44 include a frustoconical surface between the base portion 46 and the punch portion 48 forming a frustoconical countersink 52 at the pilot side of the bore 50 and the punches 44 can be controlled to form a frustoconical countersink 54 at the base or bottom face 32, which may require a separate punch.

FIGS. 5 to 8 illustrate a further step in the method of forming self-attaching female fasteners of this invention wherein openings 56 are formed in the nut section 20 between the nut bores 50 which eliminate the sharp corners of the central pilot portion 22. In this embodiment, the configured openings 56 are formed by punch 58. The punch 58 of this embodiment includes a central projecting guide post 60 adapted to be received in the generally cylindrical bores 50 of the nut section 20. In the disclosed embodiment, the central projecting guide post 60 includes a frustoconical end portion 62 having a diameter smaller than the internal diameter of the bores 50 and the guide post 60 is cylindrical having an outer diameter generally equal to but smaller than the internal diameter of the bores 50. In the disclosed embodiment, punch 58 further includes punches 64 on opposed sides of the central projecting guide post 60, equally spaced from the guide post 60 as best shown in FIGS. 6 and 7, wherein the guide post 60 leads the punches 64. That is, the guide post 60 extends longitudinally further than the punches 64. In this embodiment, the punches 64 each include symmetrical concave arcuate side faces 66 and enlarged end portions 68 as best shown in FIG. 7. As shown in FIGS. 6 and 8, the guide post 60 is replaceable and held in place by a stop member 70 shown in FIG. 8. As will be understood by those skilled in this art, the punch 58 may include only one punch 64 spaced laterally from the guide post 60.

Figure 9:
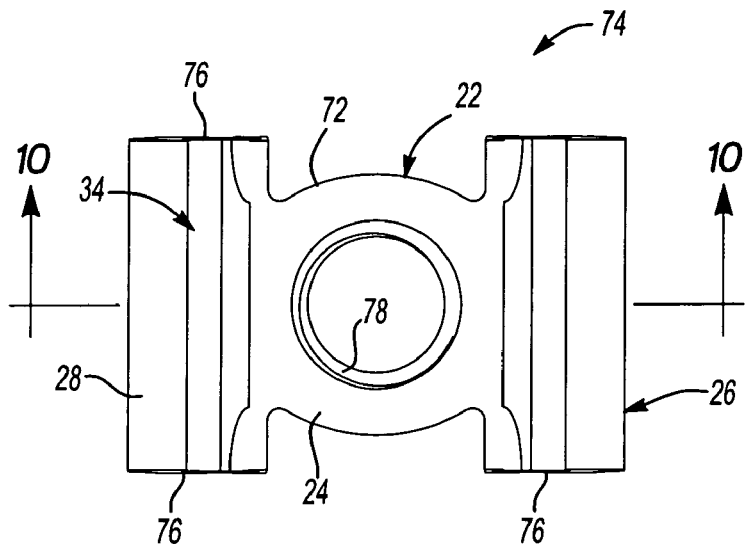
FIG. 9 is a top view of one embodiment of a self-attaching female fastener formed by the method of this invention.
Figure 10:
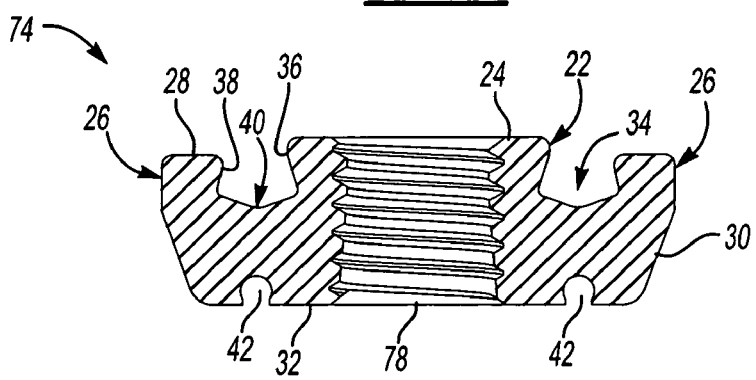
FIG. 10 is a cross-sectional view of the self-attaching female fastener shown in FIG. 9 in the direction of view arrows 10-10.
Figure 11:
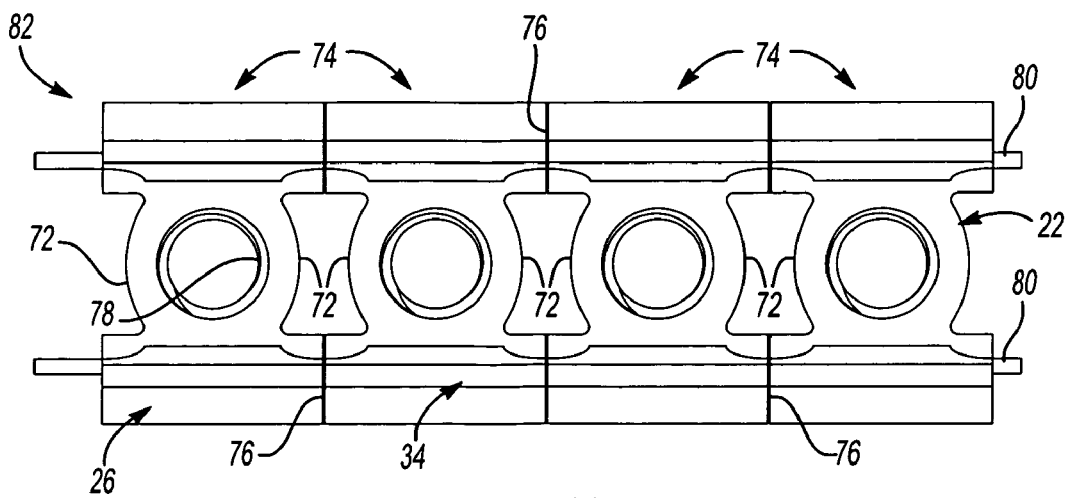
FIG. 11 is a top view of a strip of interconnected self-attaching female fasteners shown in FIGS. 9 and 10.

As best shown in FIG. 5, the punches 64 punch configured openings 56 in the nut section 20 equally spaced on opposed sides of the nut bores 50 each having convex arcuate side surfaces 72 which eliminate the sharp corners of a conventional rolled pierce nut of this type. FIGS. 9 to 11 illustrate one embodiment of a self-attaching female fastener 74 of the invention formed by the above-described method of this invention.

In this embodiment, the self-attaching female fastener 74 shown in FIG. 9 has been chopped or blanked from the nut section 20 shown in FIG. 5. As shown in FIG. 9, the self-attaching female fastener 74 has been chopped from the nut section 20 shown in FIG. 5 through the axis of the configured openings 56 forming end surfaces 76 as shown in FIG. 9. In this embodiment, the bore 50 shown in FIG. 4 has been tapped or internally threaded as shown at 78 in FIG. 10. As described above, the self-attaching female fastener 74 includes a central pilot portion 22 having a planar top pilot face 24, as shown in FIG. 10, side faces 30, a bottom face 32 having wire grooves 42, flange portions 26 on opposed sides of the central pilot portion 22 having parallel top flange faces 28 parallel to the top face 24 of the pilot portion 22. In this embodiment, the top face 24 of the pilot portion 22 is spaced above the top faces 28 of the flange portions 26. However, the top faces 28 of the flange portions 26 may be co-planar with the top pilot face 24. Further, in a preferred embodiment, the top faces 28 of the flange portions 26 include re-entrant grooves 34 having relatively inclined inner and outer side walls 36 and 38, respectively, and a V-shaped bottom wall 40 as described above. The pierce nut 74 shown in FIGS. 9 and 10 may be fed directly to a fastener installation head (not shown) by conventional bulk feed systems. As described above, a conventional fastener installation head includes a reciprocating plunger which is driven against the bottom face 32 of the self-attaching fastener, which drives the pilot top face 24 against a panel during installation.

Alternatively, as is known in this art, a plurality of self-attaching female fasteners 74 may be interconnected in side to side relation by frangible connectors, such as the parallel frangible wires 80. As will be understood by those skilled in this art, the frangible wires 80 are received in the wire grooves 42 shown in FIG. 10 and knurled or otherwise secured in place. The strip of interconnected self-attaching fasteners 82 in FIG. 11 includes a plurality of self-attaching female fasteners 74 interconnected in side to side relation by the frangible wires 80, such that the side faces 76 of the flange portions 26 abut or nearly abut as shown in FIG. 11. The pilot portions 22 of the self-attaching female fastener 74 each include convex arcuate side surfaces 72 which eliminate the sharp corners on the generally rectangular pilot portion of a conventional self-attaching female fastener or pierce nut of this type as disclosed in the above-referenced U.S. patents. The pierce nut strip 82 may now be fed to a conventional installation head (not shown) for installation in a panel as described above and disclosed in the above-referenced U.S. patents. Alternatively, as described above, pierce nuts 74 shown in FIGS. 9 and 10 may be fed to an installation head (not shown) by a conventional bulk feed system. Alternatively, as described above, the nut section 20 shown in FIG. 5 may be fed to an installation head wherein the self-attaching female fasteners 74 are chopped from the nut section 20 shown in FIG. 5 by the plunger of the installation head (not shown).

Figure 12:
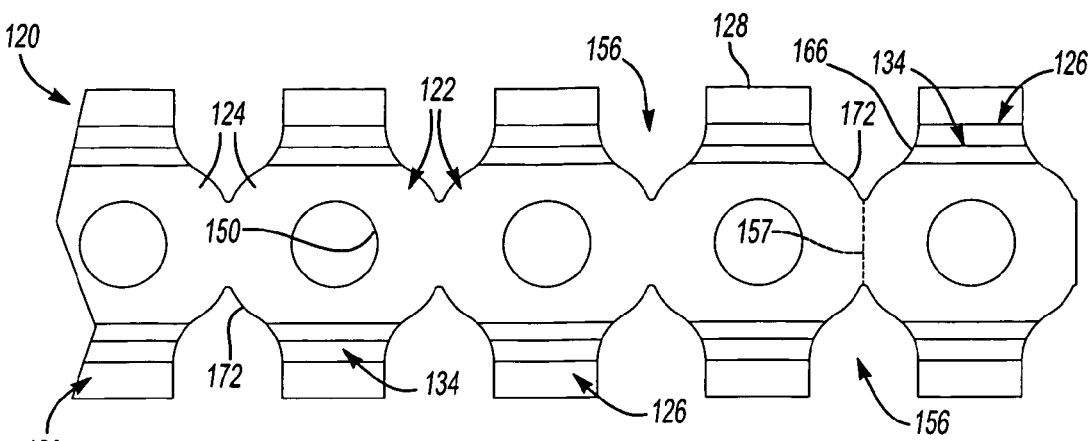
FIG. 12 is a top view of an alternative embodiment of a strip of self-attaching female fasteners.
Figure 13:
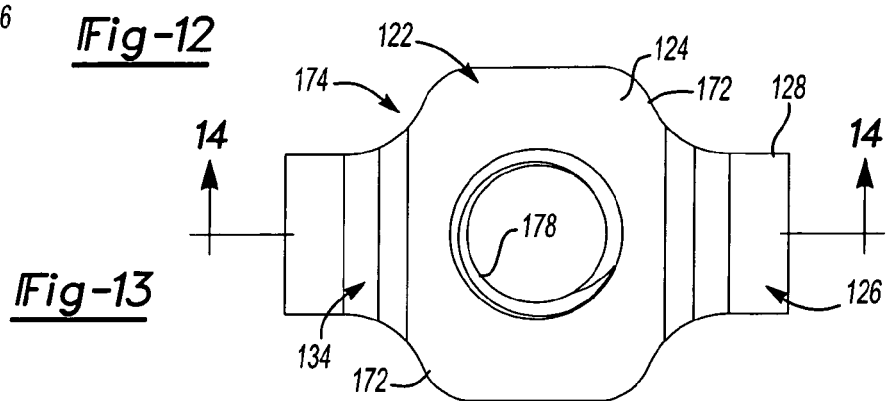
FIG. 13 is a top view of one of the self-attaching female fasteners shown in FIG. 12.
Figure 14:
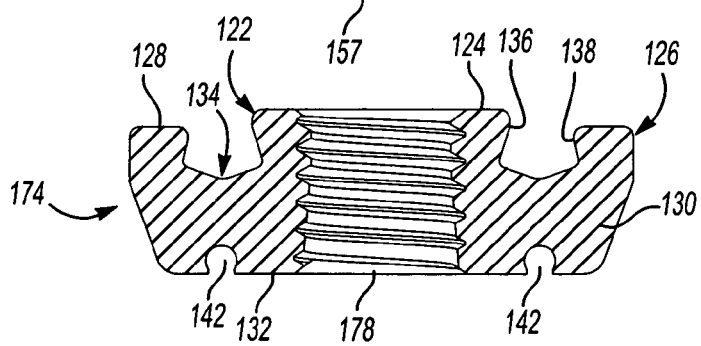
FIG. 14 is a cross-sectional view of the self-attaching female fastener shown in FIG. 13 in the direction of view arrows 14-14.
Figure 15:
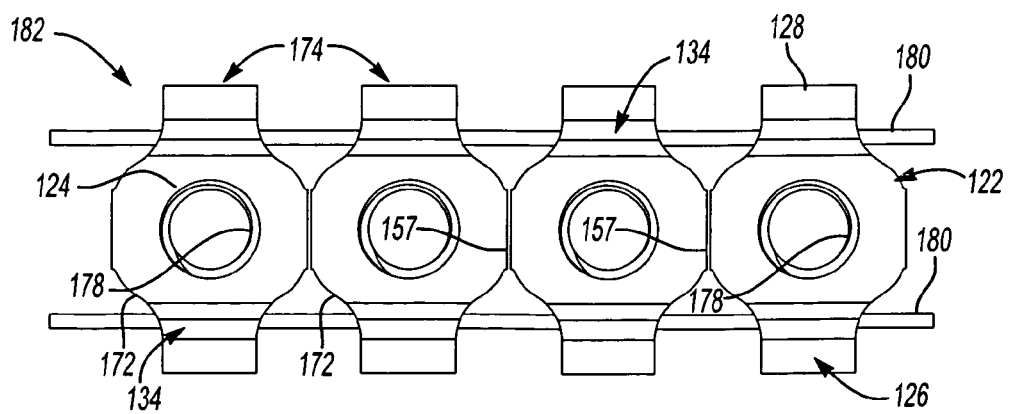
FIG. 15 is a top view of the self-attaching female fastener shown in FIGS. 12 to 14 wherein the fasteners are interconnected by frangible wire connectors.

FIGS. 12 to 15 illustrate an alternative embodiment of this invention. However, the nut section 120 shown in FIG. 12 may be formed by the same method as described above. That is, nut bores 150 are punched or pierced through the top face 124 of the central pilot portion 122 as described above with regard to FIG. 3, and configured openings 156 are then punched through the central pilot portion 122 by a punch similar to the punch shown at 58 in FIG. 5. In this embodiment, however, the configured openings 156 are generally V-shaped having an apex or bite extending toward the longitudinal axis of the nut section 120. In this embodiment, there are opposed generally V-shaped openings 156 which extend through the flange portions 126 as shown in FIG. 12. The generally V-shaped openings 156 include concave arcuate surfaces 166 forming convex arcuate surfaces. 172 which eliminate the sharp corners of the otherwise generally rectangular central pilot portions 122 as described above. The nut section 120 may be fed directly to an installation head as described above or the self-attaching female fasteners 174 as shown in FIG. 13 or the self-attaching female fasteners 174 may be blanked or severed from the nut section 120 and reconnected with frangible connectors, such as the wires 180 as shown in FIG. 15. The reference numbers used for the nut section 120 shown in FIG. 12, the self-attaching female fasteners 174 shown in FIGS. 13 and 14 and the strip of interconnected self-attaching female fasteners 182 shown in FIG. 15 are identical to the nut section 20, the self-attaching female fasteners 74 and the strip of interconnecting self-attaching fasteners 82 described above, except that the reference numbers in FIGS. 12 to 15 are in the 100 series to more clearly differentiate this embodiment from the prior embodiment previously described to limit the required description of this embodiment.

As shown in FIG. 14, which is a cross-section of the self-attaching female fastener 174 shown in FIG. 13, the cross-section of this embodiment of the self-attaching female fastener 174 is identical to the cross-section of the self-attaching female fastener 74 shown in FIG. 10. That is, the nut bore has been tapped forming an internal thread 178. As set forth above, the nut bore 150 may alternatively remain unthreaded for receipt of a self-threading or thread rolling male fastener. Further, the nut bores 150 may be tapped in the nut section 120 shown in FIG. 12 or the nut bores may be tapped after the self-attaching female fasteners 174 are blanked or chopped from the nut section 120. In this embodiment, the side faces further include a planar portion 157 shown in FIG. 13 resulting from the chopping step, wherein the nut breaks between the apices of the V-shaped openings 156 as shown by the dotted line 157 at the right of FIG. 12. Thus, when the self-attaching female fasteners 174 are interconnected or reconnected, the flat surfaces 157 of adjacent self-attaching female fasteners 174 abut or nearly abut as shown in FIG. 15. However, as described above, the side surfaces which define the original "sharp corners" are now convex arcuate surfaces 172 thereby achieving a primary object of this invention.

Figure 16:
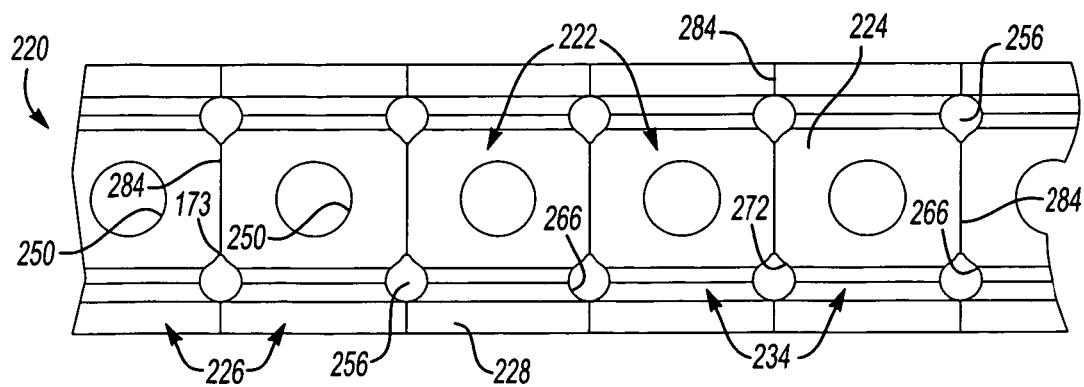
FIG. 16 is a top view of an alternative embodiment of a strip of interconnected self-attaching female fasteners.
Figure 17:
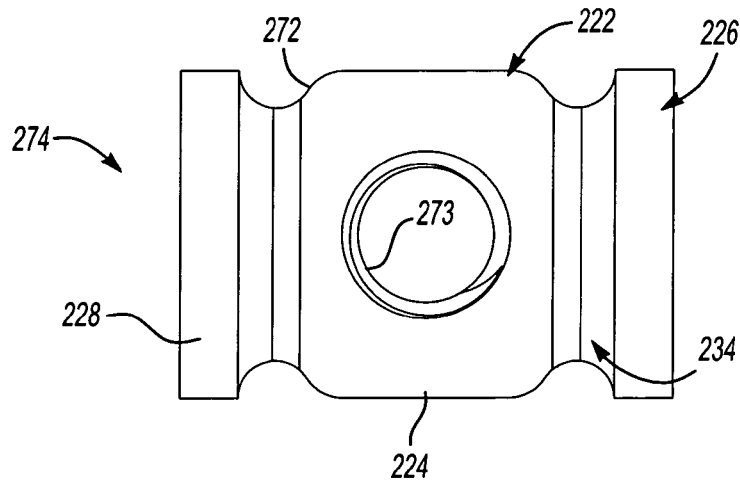
FIG. 17 is a top view of a self-attaching female fastener shown in the strip of FIG. 16.
Figure 18:
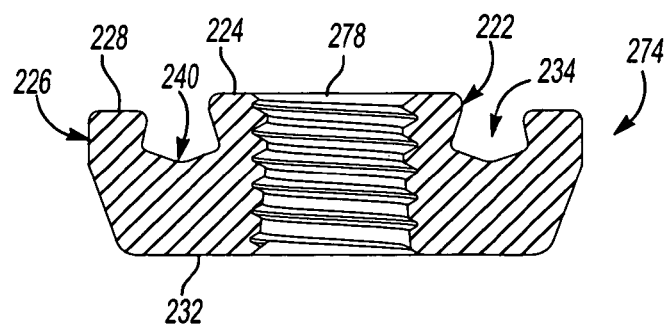
FIG. 18 is a side cross-sectional view of the self-attaching female fastener shown in FIG. 17 in the direction of view arrows 18-18.

FIGS. 16 to 18 illustrate a further alternative embodiment of this invention formed by the method of this invention described above. In this embodiment, a nut section 220 is formed by the method described above. That is, equally spaced generally cylindrical nut bores 250 are punched through the top pilot face 224 of the nut section 20 shown in FIGS. 1 and 2 as shown in FIG. 3. As described above, the nut section includes a central pilot portion 222 having a top pilot face 224, flange portions 226 on opposed sides of the central pilot portion 222 each having a planar top face 228 parallel to the top face 224 of the central pilot portion 222. In this embodiment, the nut section or strip 220 further includes re-entrant grooves 234 as described above. However, in this embodiment, the configured openings 256 punched through the central pilot portions 222 of the nut section 220 are teardrop-shaped, each having an apex 173 extending toward the longitudinal axis of the nut section 220 and concave arcuate surfaces 266 which form convex arcuate surfaces 272 of the self-attaching female fastener 274 shown in FIG. 17, eliminating the sharp corners of the rolled pierce nuts disclosed in the above-referenced U.S. patents. As set forth above, the nut section 220 may be fed directly to an installation head for attachment to a panel. In this embodiment of the nut section 220, scribe lines or notches 284 are provided to assure accurate cut-off of the nut section 220 during installation in a panel. As shown, the scribe lines 284 extend through the axis of the teardrop-shaped openings 256. Alternatively, as shown in FIGS. 17 and 18, the self-attaching female fasteners 274 may be cut or chopped from the nut section 220 as shown in FIGS. 17 and 18 and fed by a bulk feeder to an installation head. As shown in FIG. 18, the bottom face 232 of the self-attaching female fastener 274 does not include wire grooves as shown at 42 in FIG. 4. Otherwise, the cross-section of the self-attaching female fastener 274 may be identical to the embodiments of the self-attaching female fasteners 74 and 174 shown in FIGS. 10 and 14, respectively. That is, the self-attaching female fasteners 274 include a central pilot portion 222 having a planar end face 224, flange portions 226 on opposed sides of the central pilot portion 222, each having a planar top flange face 228 extending parallel to the top pilot face 224 and parallel re-entrant grooves 234 having a V-shaped bottom wall 240. As will be noted, the reference numbers used on the embodiment of the nut section 220 and self-attaching nut 274 are identical to the nut sections 20 and 120 and the self-attaching female fasteners 74 and 274 described above except that in this embodiment, the reference numbers are in the 200 series.

Having described preferred embodiments of the self-attaching female fasteners, nut strips of interconnected self-attaching female fasteners and methods of forming same of this invention, it will be understood that various modifications may be made within the purview of the appended claims. For example, the rolled cross-section of the nut section may be generally T-shaped as disclosed in the above-referenced U.S. Pat. No. 2,707,322. Further, as set forth above, the top flange faces 28, 128, 228 may be spaced below the top pilot face 24, 124, 224 or co-planar. Further, the shape of the configured openings 56, 156 and 256 is not limited to the configurations disclosed and may be modified for particular applications. For example, the width of the flange portions 126 and the grooves 134 of the nut section 120 and the self-attaching nut 174 may be increased by decreasing the width of the generally V-shaped openings 156. The embodiments of the self-attaching fasteners 74 and 274 shown in FIGS. 9 and 17 may be preferred for many applications because the flange portions 26, 226 extend the full width of the self-attaching female fastener providing a greater bearing surface for the panel than the embodiment shown in FIGS. 12 to 15. Further, the re-entrant grooves 34 of the self-attaching female fasteners 74 extend the full width of the fastener providing improved push-off strength or integrity as compared with the other embodiments. Thus, the embodiment of the self-attaching female fastener and strip of interconnected self-attaching female fasteners shown in FIGS. 5 to 11 are most preferred for many applications.

As will now be understood, the self-attaching female fastener, method and strip of interconnected female fasteners of this invention achieve the primary object of this invention which is to form self-attaching female fasteners, including pierce and clinch nuts, by rolling a nut section, preferably in a high speed rolling mill, but which eliminates the sharp corners of the rectangular pilot portion without requiring a separately formed pilot portion. As will be understood, each of the embodiments of the self-attaching female fasteners includes convex arcuate surfaces formed by piercing openings in the central pilot portion having concave arcuate surfaces. This invention thus reduces or eliminates stress cracking and propagation of stress cracks at the "corners" of the central pilot portion. Such stress cracks may reduce the integrity of the installation but also reduces the applications for such pierce nuts because leakage may occur through the stress cracks. It was not anticipated that the self-attaching female fastener of this invention would have improved retention when installed in a metal panel. However, testing of the retention of the self-attaching female fastener shown in FIGS. 9 and 10 actually resulted in over three percent improvement in retention compared to a conventional pierce nut.

The invention claimed is:

1. A method of forming self-attaching female fasteners, comprising the following steps:

rolling a metal section and forming a desired cross-section of a self-attaching female fastener, said section including a central pilot portion and flange portions on opposed sides of said central pilot portion, said central pilot portion and said flange portions extending along a longitudinal axis of said section;

punching generally cylindrical bores through said central pilot portion equally spaced along said longitudinal axis; and punching pairs of configured openings through said section, said openings of each of said pairs opposing each other about said longitudinal axis and equally spaced from said bores along said longitudinal axis, each of said opening extending into said central pilot portion and one of said flange portions, each of said openings including convex arcuate pilot surfaces extending into said central pilot portion and one of said flange portions and eliminating sharp corners of said central pilot portion.

2. The method of forming self-attaching female fasteners as defined in claim 1, wherein said method includes rolling parallel grooves in said flange portions on opposed sides of said central pilot portion, each groove having a V-shaped bottom wall.

3. The method of forming self-attaching female fasteners as defined in claim 1, wherein said method includes forming frustoconical countersinks in said bores on opposed ends of said bores.

4. The method of forming self-attaching female fasteners as defined in claim 1, wherein said method includes punching said configured openings through said central pilot portion with a punch having a projecting central guide portion receivable in said bores and a punch spaced from said projecting central guide portion with said central guide portion leading said punch, said method including receiving said projecting central guide portion in one of said bores and driving said punch into said central pilot portion punching a configured opening through said central pilot portion.

5. The method as defined in claim 4, wherein said method includes punching said configured openings through said central pilot portion with a punch having a punch equally spaced on opposed sides of said central guide portion, said method including simultaneously punching configured openings on opposed sides of said bores through said central pilot portion.

6. The method of forming self-attaching female fasteners as defined in claim 1, wherein said openings each have opposed concave arcuate side faces and enlarged end portions.

7. The method of forming self-attaching female fasteners as defined in claim 1, wherein said openings are generally V-shaped.

8. The method of forming self-attaching female fasteners as defined in claim 7, wherein said generally V-shaped openings have outwardly arcuate surfaces extending through said flange portions.

9. The method of forming self-attaching female fasteners as defined in claim 1, wherein said openings are generally teardrop-shaped.

10. The method of forming self-attaching female fasteners as defined in claim 9, wherein said method includes rolling parallel grooves in said flange portions on opposed sides of said central pilot portion and punching teardrop-shaped openings through said grooves forming arcuate surfaces on said central pilot portion adjacent said grooves.

11. The method of forming self-attaching female fasteners as defined in claim 1, wherein said method includes chopping said strip through said configured openings forming individual self-attaching female fasteners.

12. The method of forming self-attaching female fasteners as defined in claim 11, wherein said method includes interconnecting said individual self-attaching female fasteners with frangible elements.

13. A method of forming self-attaching female fasteners, comprising the following steps:

rolling a metal section and forming a desired cross-section of a self-attaching female fastener, including a continuous central pilot portion and integral flange portions on opposed sides of said central pilot portion, each of said flange portions having a top face and parallel grooves in said top face adjacent said continuous central pilot portion, said central pilot portion and said flange portions extending along a longitudinal axis of said section;

punching generally cylindrical bores through said central pilot portion equally spaced along said longitudinal axis;

punching pairs of configured openings through said section, said openings of each of said pairs opposing each other about said longitudinal axis and equally spaced from said bores along said longitudinal axis, each of said opening extending into said central pilot portion and one of said flange portions, each of said openings having arcuate side surfaces defining arcuate side faces of said central pilot portion; and chopping said strip through said pairs of openings and forming individual self-attaching female fasteners, each of said fasteners including a central pilot portion having arcuate side surfaces, integral flange portions on opposed ends of said central pilot portion and parallel grooves adjacent said central pilot portion.

14. The method of forming self-attaching female fasteners as defined in claim 13, wherein said method includes rolling a V-shaped bottom wall in said parallel grooves.

15. The method of forming self-attaching female fasteners as defined in claim 13, wherein said method includes forming frustoconical countersinks in said bores on opposed ends of said bores.

16. The method of forming self-attaching female fasteners as defined in claim 13, wherein said method includes punching said configured openings through said central pilot portion with a punch having a central projecting guide portion receivable in said bores and punches on opposed sides of said projecting central guide portion equally spaced from said central guide portion, said method including receiving said projecting central guide portion in one of said bores and driving said punches into said central pilot portion punching configured openings through said central pilot portion equally spaced from said bores.

17. The method of forming self-attaching female fasteners as defined in claim 13, wherein said openings each have opposed concave arcuate side faces and enlarged end portions adjacent said parallel grooves.

18. The method of forming self-attaching female fasteners as defined in claim 17, wherein said method includes chopping said strip through an axis of said configured openings equally spaced between said arcuate side faces.

19. The method of forming self-attaching female fasteners as defined in claim 13, wherein said opening are generally V-shaped, each opening having a bite portion adjacent said longitudinal axis of said strip and arcuate side faces.

20. The method of forming self-attaching female fasteners as defined in claim 13, wherein said openings are teardrop-shaped.

* * * * *